(12) United States Patent
Uenishi et al.

(10) Patent No.: US 6,560,090 B2
(45) Date of Patent: May 6, 2003

(54) SOLID ELECTROLYTIC CAPACITOR AND METHOD OF MANUFACTURING SAME

(75) Inventors: Yoshitsugu Uenishi, Ikoma (JP); Tsuneshi Nakamura, Hirakata (JP); Minoru Omori, Kyoto (JP); Masashi Kadoya, Kyoto (JP); Yoshihiro Higuchi, Otsu (JP); Tsuyoshi Yoshino, Kameoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/983,024

(22) Filed: Oct. 22, 2001

(65) Prior Publication Data

US 2002/0075634 A1 Jun. 20, 2002

(30) Foreign Application Priority Data

Oct. 24, 2000 (JP) ........................ 2000-323679

(51) Int. Cl.$^7$ ............................ H01G 9/045; H01G 9/00
(52) U.S. Cl. ........................ 361/529; 361/524
(58) Field of Search ................... 361/523–540

(56) References Cited

U.S. PATENT DOCUMENTS 5,142,452 A  * 8/1992 Saiki ..................... 29/25.03
5,254,137 A  * 10/1993 Mitani ............... 148/DIG. 138

FOREIGN PATENT DOCUMENTS

| JP | 5-98464 | 4/1993 |
| JP | 6-196349 | 7/1994 |

* cited by examiner

Primary Examiner—Dean A. Reichard
Assistant Examiner—Eric Thomas
(74) Attorney, Agent, or Firm—McDermott, Will & Emery

(57) ABSTRACT

A solid electrolytic capacitor having excellent solder wettability and heat resisting adhesion and a method of manufacturing same are obtained by a simple plating configuration. The capacitor includes a capacitor element, positive electrode terminal and negative electrode terminal. The positive electrode terminal and the negative electrode terminal include a metallic member containing (i) at least one selected from the group consisting of nickel, nickel alloy, copper and copper alloy, (ii) a first plated layer of tin or tin alloy, directly disposed without undercoat on the metallic member, and (iii) an intermetallic compound layer formed between the metallic member and the first plated layer. The intermetallic compound layer contains tin-nickel or tin-copper formed through heat reflow treatment of the metallic member disposed on the first plated layer.

25 Claims, 12 Drawing Sheets

SOLID ELECTROLYTIC CAPACITOR AND METHOD OF MANUFACTURING SAME

FIELD OF THE INVENTION

The present invention relates to an electrolytic capacitor used for various electronic apparatus, and particularly, to a surface-mounted type solid electrolytic capacitor having terminals for external connection, and a method of manufacturing same.

BACKGROUND OF THE INVENTION

As conventional solid electrolytic capacitors having terminals for external connection, surface-mounted type tantalum solid electrolytic capacitors are representative ones, which are used for various electronic apparatus in large quantities. This type of tantalum solid electrolytic capacitor is described as an example in the following. The configuration of such conventional tantalum solid electrolytic capacitor includes a capacitor element portion and lead frame portion. As a material for the lead frame, nickel-base alloy or copper-base alloy is mainly used. Particularly, nickel-base alloy such as 42 alloy is used when the terminal of the lead frame portion is required to have a repeated bending strength or the terminal is required to have a mechanical strength enough to endure actual device installation. Also, copper-base alloy such as copper-nickel-tin alloy is used when the lead frame portion is required to have specially high processability.

A conventional tantalum solid electrolytic capacitor of this type will be described in the following with reference to FIG. 12 and FIG. 14.

FIG. 12 is a sectional view showing the configuration of a conventional tantalum solid electrolytic capacitor. In FIG. 12, the conventional tantalum solid electrolytic capacitor comprises a capacitor element 12 and positive electrode lead wire 13. The capacitor element 12 comprises a porous positive electrode body, and a dielectric oxide film layer, solid electrolytic layer and negative electrode layer (all of these are not shown) which are sequentially formed on the outer surface of the positive electrode body. The porous positive electrode body is formed by sintering a compact of tantalum powder. One end of the positive electrode lead wire 13 is exposed. One end of positive electrode terminal 14 is connected by welding or the like to the positive electrode lead wire 13 of the capacitor element 12. The other end of the positive electrode terminal 14 is led out of outer jacket resin 17 described later and is bent along the outer jacket resin 17. In this way, a terminal for external connection is formed. One end of negative electrode terminal 15 is connected to the negative electrode layer of the capacitor element 12 via conductive bonding agent 16, and the other end of the negative electrode terminal 15 is led out of the outer jacket resin 17 described later and is bent along the outer jacket resin 17. In this way, a terminal for external connection is formed. The capacitor element 12 is coated with the outer jacket resin 17 capable of electrical insulation so that each of the positive electrode terminal 14 and negative electrode terminal 15 is partially exposed to the outside.

FIG. 13 is a plan view showing the lead frame which forms the positive electrode terminal 14 and the negative electrode terminal 15. FIG. 14 is a sectional view of the line 14A—14A portion of FIG. 13. In FIG. 13 and FIG. 14, lead frame 18 is formed of a strip-form metallic member made of nickel-base alloy (such as 42 alloy) or copper-base alloy (such as copper-nickel-tin alloy). The positive electrode terminal 14 and the negative electrode terminal 15 are formed at the lead frame 18. Silver-plated layer 20 is disposed at element fixed portion 19. Guide hole 21 for transport is formed in the lead frame 18. As an undercoat layer 22, a copper or copper alloy plated layer of 0.3 μm in thickness is disposed on the positive electrode terminal 14 and the negative electrode terminal 15. For soldering in actual device installation, plated layer 23 for soldering, formed from tin or tin-lead alloy, is disposed on the undercoat layer 22.

Next, a method of manufacturing a conventional tantalum solid electrolytic capacitor having such configuration as described above.

First, the capacitor element 12 is disposed at element fixed portion 19 located between the oppositely disposed positive electrode terminal 14 and negative electrode terminal 15 extending from the lead frame 18. The positive electrode lead wire 13 of the capacitor element 12 is connected by welding or the like to the positive electrode terminal 14 formed at the lead frame 18. The negative electrode layer of the capacitor element 12 is bonded by conductive bonding agent 16 of silver paste to silver plated layer 20 disposed on the negative electrode terminal 15 formed at the lead frame 18. The conductive bonding agent 16 is hardened under heat to establish electrical connection. The bonding agent 16 is heated at temperatures of 170° C. to 180° C. for about one hour for hardening.

Next, with each of the positive electrode terminal 14 and negative electrode terminal 15 partially exposed to the outside, the capacitor 12 is coated by outer jacket resin 17 capable of electrical insulation. Thus, the outer jacket resin 17 is heat-treated at 170° C. to 180° C. for about six hours for complete hardening. In this way, the outer jacket resin 17 is improved in cross-linking ability, and as a result, the tantalum solid electrolytic capacitor will be, for example, improved in moisture resistance. After that, thermal screening is performed in a furnace at 240° C. to 260° C. for about 60 sec. Thus, excessive current leakage or shorting trouble that may cause hindrance to the user during actual reflow soldering, for example, can be prevented from occurrence. After that, unnecessary portions of the lead frame 18 are removed, and thereafter, the characteristic and appearance inspections are performed before delivery of the finished product.

In the assembling process of a conventional tantalum solid electrolytic capacitor manufactured by such manufacturing method as described above, the capacitor will be subjected to severe heat history in the atmosphere. Therefore, the plated film is required to be heat resisting adhesion even after application of such heat history, and further, it is required to ensure excellent solder wettability, for example, during reflow soldering performed by the user.

Also, in this way, for making the plated film heat resistant and realizing excellent solder wettability, it is necessary for the copper or copper alloy plated layer disposed as the undercoat layer 22 for the above conventional positive electrode terminal 14 and negative electrode terminal 15 to have a thickness of 0.3 μm at least. The thickness of the undercoat layer 22 is closely related to the heat resisting adhesion of the tin or tin-lead alloy plated layer as the plated layer 23 for soldering which is disposed on the undercoat layer 22. Also, the adhesion of the tin plated layer or tin-lead alloy plated layer depends upon the forming volume of thermal diffusion layer in connection with the copper or copper alloy plated layer that is the undercoat layer 22, and the copper or copper alloy plated layer acts to promote the formation of the thermal diffusion layer.

Thus, since the copper or copper alloy plated layer provided as the undercoat layer 22 contributes to heat resisting adhesion, the state of plated film is preferable to be very dense. To achieve the purpose, it is necessary to perform the plating under appropriate conditions with respect to the current density and plating bath control. Due to such severe conditions for plating bath control, it is possible to realize a plating thickness of 0.3 $\mu$m or over. If such conditions are not satisfied, for example, performing the plating at excessive current density, then the copper or copper alloy plated layer formed will become porous. Accordingly, the layer is insufficient in adhesion. Also, even when the plated film of the copper or copper alloy plated layer is very dense, sufficient heat resisting adhesion cannot be obtained if the plating thickness is less than 0.3 $\mu$m. The upper limit of the plating thickness for the above copper or copper alloy plated layer is not limited, but it is preferable to be about 4 $\mu$m or less.

Accordingly, as a method of forming excellent plated film on a conventional lead frame 18, one of the following two methods has been employed.

The first method is such that when the strip-form metallic member used is made of nickel-base alloy or copper-base alloy, very dense undercoat layer 22 is formed on the strip-form metallic member in order to provide the solder or tin-plated film with a specified adhesion. The undercoat layer 22 is formed by nickel plating or copper plating, or by both of nickel plating and copper plating. Subsequently, silver plated layer 20 is formed in the form of stripes by electrolytic plating on a desired surface portion of negative electrode terminal 15 connected to the negative electrode layer of capacitor element 12 of the lead frame 18. The silver plated layer 20 thus formed is improved in conformability with the negative electrode terminal 15. On the entire surface and back of the lead frame 18 other than the silver plated layer 20 is formed a plated layer 23 for soldering which is formed from solder or tin plated film. After that, punching by a die is performed to make the positive electrode terminal 14 and negative electrode terminal 15. That is, in the first method, plated film is formed on a strip-form metallic member, followed by punching process to make the positive electrode terminal 14 and negative electrode terminal 15.

The second method is such that the strip-form metallic member is punched in advance to continuously make the positive electrode terminal 14 and negative electrode terminal 15 in the form of hoops on the lead frame 18, and after that, same processing as in the first method is performed in order to form plated film.

However, in the positive electrode terminal 14 and the negative electrode terminal 15 of the above conventional solid electrolytic capacitor, the undercoat layer is formed by nickel plating on the lead frame 18 formed of a strip-form metallic member. After that, when the lead frame is further tin- or solder-plated, an intermetallic compound layer is formed between tin and nickel due to severe heat history applied during the manufacturing process, thereby losing the surface tin or solder layer. As a result, there arises a problem of worsening of solder wettability. In order to solve this problem, it is necessary to form the tin-plated layer or solder-plated layer thicker enough so that excellent solder wettability can be obtained even after heat history. In this case, the cost of the product will become very high. Accordingly, it is difficult to employ the method from the industrial point of view.

Also, in the method of manufacturing the positive electrode terminal 14 and the negative electrode terminal 15, even when the lead frame 18 formed of a strip-form metallic member is plated with copper or nickel, and further plated with copper, followed by tin or solder plating, there is formed an intermetallic compound between tin and copper due to severe heat history. And it results in losing the surface tin layer or solder layer. Consequently, there arises a problem of worsening of the solder wettability. Also, there is a problem of peeling that is generated between the tin-copper intermetallic compound layer and the plated layer.

In order to solve these problems, the Japanese Laid-Open Patent H5-98464 proposes the following method. A copper undercoat layer of 0.1 $\mu$m to 1.0 $\mu$m in thickness is formed on the base material of the lead frame formed from nickel or nickel alloy, and further, tin or solder plated layer is formed on the copper undercoat layer. After that, reflow treatment or hot dipping of tin or solder is performed. Thus, a tin-copper intermetallic compound of 0.2 $\mu$m to 2.0 $\mu$m in thickness is formed between the base material formed from nickel or nickel alloy and the plated layer such as tin-plated layer or solder-plated layer.

Also, the Japanese Laid-Open Patent H6-196349 proposes the following method. A nickel undercoat layer is formed on the base material of the lead frame formed from copper or copper alloy, and further, a copper undercoat layer of 0.1 $\mu$m to 1.0 $\mu$m in thickness is formed on the nickel-plated layer. Subsequently, a tin or solder plated layer is formed on the copper undercoat layer. After that, reflow treatment or hot dipping of tin or solder is performed on the copper undercoat layer. Thus, a tin-copper intermetallic compound of 0.2 $\mu$m to 2.0 $\mu$m in thickness is formed on the nickel-plated layer.

However, when such prior art is used for lead frames of tantalum solid electrolytic capacitors, it is absolutely necessary to form a copper undercoat layer for the purpose of forming a tin-copper intermetallic compound layer. Therefore, the cost of the product will become very high, and it is difficult to employ the method from the commercial and industrial points of view.

The present invention is intended to provide a solid electrolytic capacitor which ensures excellent solder wettability for a long period of time due to the plated film having a simplified configuration and is also provided with terminals having excellent solder wettability and heat resisting adhesion, and a method of manufacturing same.

SUMMARY OF THE INVENTION

A solid electrolytic capacitor of the present invention comprises:

a capacitor element having a positive electrode leading portion and a negative electrode leading portion;

a positive electrode terminal electrically connected to the positive electrode leading portion; and a negative electrode terminal electrically connected to the negative electrode leading portion, wherein the positive electrode terminal and the negative electrode terminal comprise:
one metallic member including at least one selected from the group consisting of nickel, nickel alloy, copper and copper alloy;
a first plated layer, including at least one of tin and tin alloy, disposed on the metallic member; and
an intermetallic compound layer formed between the metallic member and the first plated layer, and wherein the intermetallic compound layer comprises (i) tin contained in one out of the tin and tin alloy, and (ii) a compound including at least one out of nickel and tin contained in the metallic member.

Preferably, the intermetallic compound is formed by heat reflow treatment of the metallic member disposed on the first plated layer.

In this way, it is possible to obtain a solid electrolytic capacitor which ensures excellent solder wettability for a long period of time due to the plated film having a simplified configuration and is also provided with terminals having excellent solder wettability and heat resisting adhesion, and a method of manufacturing same.

Figure 1:
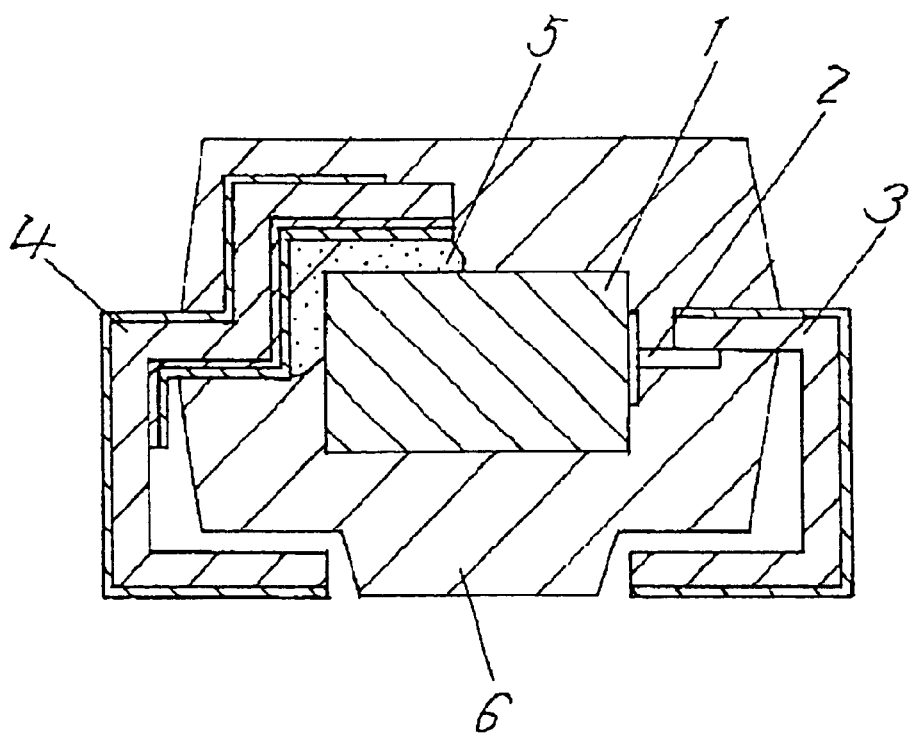
FIG. 1 is a sectional view showing the configuration of a tantalum solid electrolytic capacitor in the embodiment 1 of the present invention.

| Description of the Reference Numerals | |
|---|---|
| 1 | Capacitor element |
| 2 | Positive electrode lead wire |
| 3, 3A, 3B, 3C | Positive electrode terminals |
| 4, 4A, 4B, 4C | Negative electrode terminals |
| 5 | Conductive bonding agent |
| 6 | Outer jacket resin |
| 7 | First plated layer, tin plated layer, copper alloy plated layer |
| 7a | Second plated layer, tin plated layer |
| 8 | Nickel undercoat layer |
| 9 | Silver plated layer |
| 10 | Element fixed portion |
| 11 | Metallic member, lead frame |

DETAILED DESCRIPTION OF THE INVENTION

A solid electrolytic capacitor in one embodiment of the sent invention comprises:

a capacitor element having a positive electrode leading portion and a negative electrode leading portion;

a positive electrode terminal electrically connected to the positive electrode leading portion; and a negative electrode terminal electrically connected to the negative electrode leading portion, wherein the positive electrode terminal and the negative electrode terminal comprise:
  one metallic member including at least one selected from the group consisting of nickel, nickel alloy, copper and copper alloy;
  a first plated layer, including at least either one of tin and tin alloy, disposed on the metallic member; and
  an intermetallic compound layer formed between the metallic member and the first plated layer, and
  wherein the intermetallic compound layer comprises (i) tin contained in one of the tin and tin alloy and (ii) a compound including at least either one of nickel and tin contained in the metallic member.

Thus, the first plated layer has a simplified configuration requiring no undercoat layer and is able to ensure excellent heat resisting adhesion.

Preferably, the positive electrode terminal and the negative electrode terminal comprise
  the metallic member,
  the first plated layer directly disposed, without undercoat layer, on the metallic member, and
  the intermetallic compound layer formed by heat reflow treatment between the metallic member and the first plated layer.

Preferably, the positive electrode terminal includes a plate positive electrode terminal having a first surface and a second surface positioned at the opposite side of the first surface,
  the negative electrode terminal includes a plate negative electrode terminal having a first surface and a second surface positioned at the opposite side of the first surface, and
  the first plated layer and the intermetallic compound layer are disposed on at least either one of the first surface and the second surface of the positive electrode terminal and the negative electrode terminal.

Preferably, the solid electrolytic capacitor further comprises an insulative outer jacket resin disposed to cover the capacitor element, Wherein the outer jacket resin is disposed so that each of the positive electrode terminal and negative electrode terminal is partially exposed to the outside.

By each of the above configurations, it is possible to obtain a solid electrolytic capacitor which ensures good solder wettability for a long period of time due to the plated film having a simple configuration and is provided with terminals having excellent wettability and heat resisting adhesion.

Preferably, the first surfaces of the positive electrode terminal and the negative electrode terminal include the first plated layer and the intermetallic compound layer, the second surfaces of at least one of the positive electrode terminal and negative electrode terminal includes an undercoat layer having nickel and a silver plated layer formed on the undercoat layer, and a portion having the silver plated layer is electrically connected to the capacitor element.

Thus, besides the action and effects described above, it is possible to assure excellent electrical characteristics and actual solder wettability due to the thickness of both plated layers.

Preferably, the second surfaces of the positive electrode terminal and the negative electrode terminal include an undercoat layer having nickel, the negative electrode terminal includes a silver plated layer formed on the undercoat layer, and a portion having the silver plated layer is electrically connected to the capacitor element.

Preferably, the first surfaces of the positive electrode terminal and the negative electrode terminal include the first plated layer directly disposed, without undercoat layer, on the metallic member, and the intermetallic compound layer formed by heat reflow treatment between the metallic member and the first plated layer.

Thus, the above effect will be further enhanced.

Preferably, the first surface of the positive electrode terminal and the negative electrode terminal include the first plated layer and the intermetallic compound layer, at least one second surface of the positive electrode terminal and the negative electrode terminal includes a connection to the capacitor element and a second plated portion disposed apart from the connection at a specified interval, the connection includes an undercoat layer having nickel and a silver plated layer disposed on the undercoat layer, and the second plated portion includes at least either one of tin plated and tin alloy plated layers disposed on the metallic member. Thus, besides the action and effects described above, it is possible to enhance the electrical characteristics of the capacitor.

Preferably, the specified interval provided between the connection and the second plated layer is 0.5 mm or over.

Thus, it is possible to further obtain excellent effects as described above.

Preferably, each first surface of the positive electrode terminal and the negative electrode terminal includes the first plated layer and the intermetallic compound layer, at least one second surfaces of the positive electrode terminal and the negative electrode terminal includes a connection to the capacitor element and a second plated portion disposed apart from the connection at a specified interval, the connection includes an undercoat layer having nickel and a silver plated layer disposed on the undercoat layer, and the second plated portion includes at least one of tin plated layer and tin alloy plated layer disposed on the metallic member and an intermetallic compound layer disposed between the metallic member and the plated layer.

Thus, plating is performed on only one side of the plate metallic member. Accordingly, it is possible to reduce the cost by simplifying the manufacturing process.

Preferably, the first plated layer is 4.0 $\mu$m or over in thickness. By this configuration, it is possible to assure the optimum thickness of the intermetallic compound layer and to obtain a tin plated layer higher in heat resisting adhesion.

Preferably, the intermetallic compound layer is in a range from 0.4 $\mu$m to 2.0 $\mu$m in thickness. Thus, it is possible to reliably obtain a tin plated layer higher in heat resisting adhesion.

Preferably, the silver plated layer is 0.3 $\mu$m or over in thickness. By this configuration, it is possible to assure the optimum thickness of the intermetallic compound layer and to obtain a tin plated layer higher in heat resisting adhesion.

Preferably, the first plated layer is a tin plated layer. By this configuration, the above effects will be further enhanced.

Preferably, the first surface includes an exposed portion not covered by the outer jacket resin and an outer jacket portion covered with the outer jacket resin, and the first plated layer disposed on the exposed portion is thinner by 0.2 $\mu$m to 1.0 $\mu$m than the first plated layer disposed on the outer jacket portion. By this configuration, besides the effects described above, it is possible to reduce bending stresses when bending the positive electrode and negative electrode terminals is performed after molding with outer jacket resin. As a result, leak current of the capacitor will be decreased.

Preferably, the capacitor element comprises:

a porous positive electrode body formed by sintering a compact having valve metal powder;

a dielectric oxide film layer formed on the porous positive electrode body;

a solid electrolytic layer disposed on the dielectric oxide film layer; and a negative electrode layer disposed on the solid electrolytic layer, wherein the positive electrode terminal is electrically connected to the positive electrode body, and the negative electrode terminal is electrically connected to the negative electrode layer.

By this configuration, it is possible to obtain a capacitor which ensures the effects described above.

Preferably, the capacitor element comprises:

a valve metal;

a dielectric oxide film layer formed on the surface of the valve metal;

a solid electrolytic layer consisting of conductive polymer disposed on the dielectric oxide film layer; and a negative electrode layer disposed on the solid electrolytic layer, wherein the positive electrode terminal is electrically connected to the positive electrode body, and the negative electrode terminal is electrically connected to the negative electrode layer.

By this configuration, it is possible to obtain a capacitor which ensures the effects described above.

Preferably, the positive electrode terminal and the negative electrode terminal are bent so that each first surface of the positive electrode terminal and the negative electrode terminal is positioned on same plane, and each of the first surfaces can be soldered onto a substrate.

Preferably, one end of the negative electrode terminal and the negative electrode leading portion are electrically connected to each other by conductive bonding agent.

Preferably, each first surface of the positive electrode terminal and the negative electrode terminal comprises the first plated layer directly disposed on the metallic member, and the intermetallic compound layer formed by reflow treatment between the metallic member and the first plated layer;

the second surface of the negative electrode terminal has a connection,
   the connection includes a nickel undercoat layer disposed on the metallic member, and a silver plated layer disposed on the undercoat layer,
   the connection is electrically connected to the negative electrode leading portion,
   the second surface of the positive electrode terminal is electrically connected to the positive electrode leading portion,
   the positive electrode terminal and the negative electrode terminal are bent so that each first surface of the positive electrode terminal and the negative electrode terminal is positioned on same plane, and
   each of the first surfaces can be soldered onto a substrate.

Preferably, each first surface of the positive electrode terminal and the negative electrode terminal comprises the first plated layer directly disposed on the metallic member, and the intermetallic compound layer formed by heat reflow treatment between the metallic member and the first plated layer;

each second surface of the positive electrode terminal and the negative electrode terminal comprises a nickel undercoat layer disposed on the metallic member;
   the second surface of the negative electrode terminal has a connection,
   the connection includes a silver plated layer disposed on the undercoat layer;
   the connection is electrically connected to the negative electrode leading portion,
   the second surface of the positive electrode terminal is electrically connected to the positive electrode leading portion;
   the positive electrode terminal and the negative electrode terminal are bent so that each first surface of the positive electrode terminal and the negative electrode terminal is positioned on same plane, and
   each of the first surfaces can be soldered onto a substrate.

Preferably, each first surface of the positive electrode terminal and the negative electrode terminal comprises the first plated layer directly disposed on the metallic member, and the intermetallic compound layer formed by heat reflow treatment between the metallic member and the first plated layer;

the second surface of the positive electrode terminal comprises a second tin plated layer directly disposed on the metallic member, and a second intermetallic compound layer formed by heat reflow treatment between the metallic member and the second tin plated layer;
   the second surface of the negative electrode terminal includes a connection and a second tin plated portion disposed apart from the connection at a specified interval,
   the connection has a nickel plated undercoat layer disposed on the metallic member, and a silver plated layer disposed on the undercoat layer;
   the connection is electrically connected to the negative electrode leading portion,
   the second surface of the positive electrode terminal is electrically connected to the positive electrode leading portion;
   the positive electrode terminal and the negative electrode terminal are bent so that each first surface of the positive electrode terminal and the negative electrode terminal is positioned on same plane, and
   each of the first surfaces can be soldered onto a substrate.

Preferably, the first surface of the positive electrode terminal comprises the first plated layer, and the intermetallic compound layer formed by heat reflow treatment between the metallic member and the first plated layer;

the first surface of the negative electrode terminal includes a connection, and a second plated portion disposed apart from the connection at a specified interval;
   the connection has a nickel plated undercoat layer disposed on the metallic member and a silver plated layer disposed on the undercoat layer;
   the second plated layer includes the first plated layer, and the intermetallic compound layer formed by heat reflow treatment between the metallic member and the first plated layer;
   the connection is electrically connected to the negative electrode leading portion;
   one end of the first surface of the positive electrode terminal is electrically connected to the positive electrode leading portion;
   the positive electrode terminal and the negative electrode terminal are bent so that each first surface of the positive electrode terminal and the negative electrode terminal is positioned on same plane, and
   each of the first surfaces can be soldered onto a substrate.

Preferably, the metallic member includes at least either one of the nickel and nickel alloy, and
   the intermetallic compound layer is a compound containing tin and nickel.

Preferably, the metallic member includes at least either one of the copper and copper alloy, and
   the intermetallic compound layer is a compound containing tin and copper.

A method of manufacturing a solid electrolytic capacitor of the present invention comprises the steps of:

(a) forming a first plated layer, without undercoat layer, directly on a first surface of a metallic member;
      subsequently forming an intermetallic compound layer between the metallic member and the first plated layer by heat reflow treatment,
      where the first plated layer includes at least either one of tin and tin alloy;
   (b) forming a nickel undercoat layer on a second surface connection of the metallic member, and further forming a silver plated layer on the undercoat layer;
   (c) punching the metallic member into a predetermined shape to form positive electrode terminals and negative electrode terminals,
      where the metallic member is punched so that one end of the negative electrode terminal is formed as the connection;
   (d) bending the positive electrode terminal and the negative electrode terminal into predetermined shapes; and
   (e) electrically connecting the connection to the negative electrode leading portion of a capacitor element, and electrically connecting one end of the positive electrode terminal to the positive electrode leading portion of the capacitor element.

By the above method, the manufacturing processes can be simplified. As a result, it is possible to manufacture solid electrolytic capacitors at low costs.

Preferably, the undercoat layer is a nickel layer formed by electrolytic plating, and the silver plated layer is formed by electrolytic plating.

Preferably, the metallic member is formed from either one of nickel and nickel-iron alloy, and
the intermetallic compound layer includes an intermetallic compound of tin and nickel.

Preferably, the metallic member is formed from either one of copper and copper alloy, and the intermetallic compound layer includes an intermetallic compound of tin and copper.

Preferably, a step of forming the intermetallic compound layer is such that the metallic member which forms the first plated layer is subjected to heat reflow treatment at 400° C. to 800° C. in an oxygen atmosphere of 200 PPM or less, and the first plated layer is melted by the heat reflow treatment to form an intermetallic compound layer, containing tin and the metal of the metallic member, between the metallic member and the first plated layer.

Preferably, the manufacturing method further comprises the steps of:
(f) disposing outer jacket resin by covering the capacitor element and the connection with the resin in such manner that the other end of the positive electrode terminal and the other end of the negative electrode terminal are exposed; and
(g) bending the positive electrode terminal and the negative electrode terminal not covered by the outer jacket resin.

The effects described above will be further enhanced due to each of the above manufacturing methods.

Preferably, the step (a) and the step (b) include:
a step of forming a nickel undercoat layer on the connection of the second surface of the metallic member, and further forming the silver plated layer on the undercoat layer;
also, a step of forming a first plated layer at a position spaced apart at least 0.5 mm from the connection;
a step of forming a second plated layer which contains at least either one of tin and tin alloy, without undercoat, directly on the first surface of the metallic member; and
forming the intermetallic compound layer between the metallic member and the first plated layer by heat reflow treatment of the metallic member having the first plated layer, the second plated layer and the connection, and also forming a second intermetallic compound layer between the metallic member and the second plated layer.

By the above method, it is possible to reliably manufacture solid electrolytic capacitors which are excellent in solder wettability and electrical characteristics.

Preferably, after the step of forming the positive electrode terminal and the negative electrode terminal by punching the metallic member of the step (c), The step of forming the plated layer and the intermetallic compound layer on the first surface as in the step (a) and step of forming the connection on the second surface as in the step (b) are executed.

By the above method, the effects described above will be further enhanced.

Preferably, after the step (a) and the step (b), the step (c) is executed.

By this method, it is possible to reliably manufacture solid electrolytic capacitors which are excellent in solder wettability and electrical characteristics.

Preferably, the manufacturing method further comprises:
a step of disposing outer jacket resin by covering the capacitor element and the connection with the resin in such manner that the other end of the positive electrode terminal and the other end of the negative electrode terminal are exposed; and
blasting the first plated layer disposed on the positive electrode terminal and negative electrode terminal, formed at the portion not covered by the outer jacket resin, thereby making the first plated layer thinner.

By this method, bending stresses can be reduced when a positive electrode terminal and a negative electrode terminal are bent after molding by outer jacket resin. As a result, leak current of the capacitor will be decreased, improving the electrical characteristics of the capacitor. In addition, it is possible to reliably manufacture excellent solid electrolytic capacitors.

The exemplary embodiments of the present invention will be described in the following with respect to a solid electrolytic capacitor and a method of manufacturing same.

Exemplary Embodiment 1

FIG. 1 is a sectional view showing the configuration of a tantalum electrolytic capacitor (hereafter called capacitor) as a solid electrolytic capacitor in the first exemplary embodiment of the present invention.

In FIG. 1, the capacitor comprises a capacitor element 1, positive electrode lead wire 2, positive electrode terminal 3, negative electrode terminal 4, conductive bonding agent 5, and outer jacket resin 6. The capacitor element 1 includes a positive electrode body, and a conductive oxide film layer, solid electrolytic layer and negative electrode layer (not shown) which are sequentially laminated on the positive electrode body. The capacitor element 1 includes a positive electrode leading portion and a negative electrode leading portion. The negative electrode terminal 4 is electrically connected to the negative electrode leading portion. The positive electrode terminal is electrically connected to the positive electrode leading portion. The positive electrode body is formed by sintering a compact of tantalum powder, and the positive electrode body is porous. The outer jacket resin 6 covers the capacitor element 1 in a state such that each of the positive electrode terminal 3 and negative electrode terminal 4 is partially exposed to the outside. The outer jacket resin 6 is capable of electrical insulation. The positive electrode lead wire 2 as a positive electrode leading portion is connected to the positive electrode body, and one end of the positive electrode lead wire 2 extends from the surface of the positive electrode body. One end of the positive electrode terminal 3 is connected by welding or the like to the positive electrode lead wire 2. The other end of the positive electrode terminal 3 extends out of the outer jacket resin 6 and is bent along the outer jacket resin 6. In this way, one end of the negative electrode terminal 4 is connected by the conductive bonding agent 5 to the negative electrode layer of the capacitor element 1. The negative electrode terminal 4 is formed as one terminal for external connection. The other end of the negative electrode terminal 4 extends out of the outer jacket resin 6 and is bent along the outer jacket resin 6. Thus, the other terminal for external connection is formed.

Figure 2:
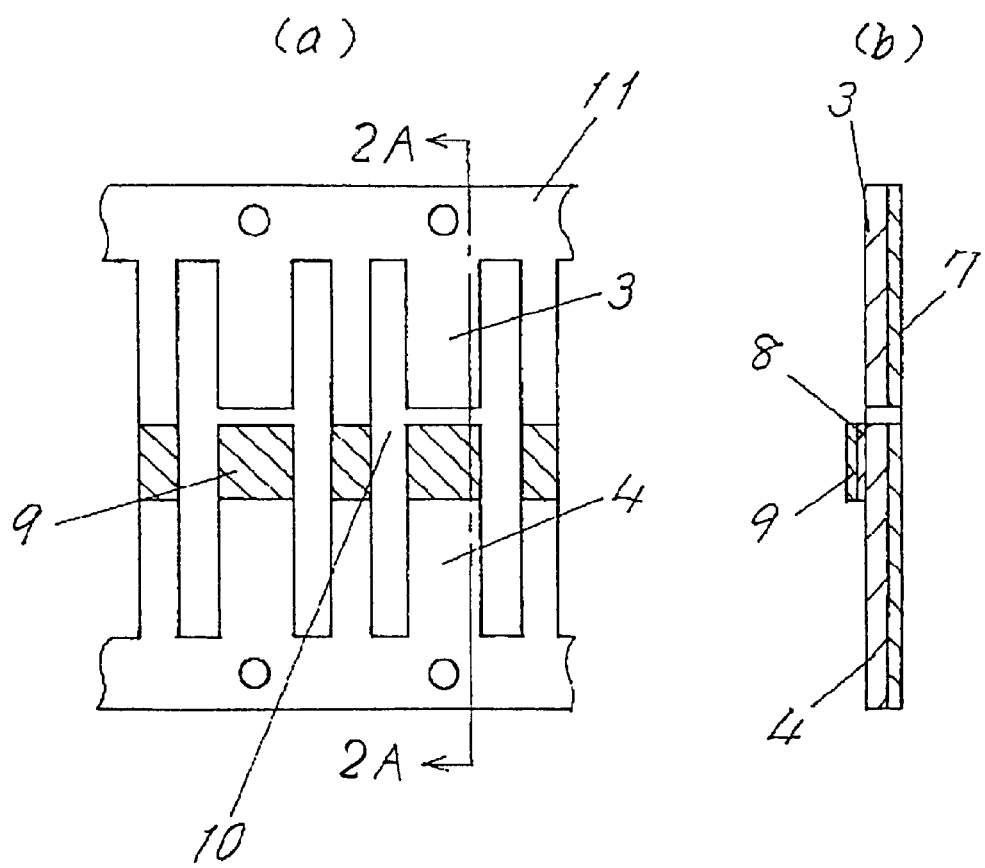
FIG. 2 shows a plan view of a lead frame forming a positive electrode terminal and a negative electrode terminal used for a capacitor used in a tantalum solid electrolytic capacitor in the embodiment of the present invention, and a sectional view of the 2A—2A line portion of same.

FIG. 2 shows a plan view and sectional view of a lead frame forming the positive electrode terminal 3 and negative electrode terminal 4 used for the capacitor. FIG. 2(b) is a sectional view of the 2A—2A line portion of FIG. 2(a). In FIG. 2, the lead frame 11 comprises a strip-form metallic member formed from nickel or iron-nickel alloy (such as 42 alloy), or copper or copper alloy (such as copper-nickel-tin alloy). That is, the lead frame 11 is metallic member 11. The positive electrode terminal 3 and negative electrode terminal 4 are formed on the lead frame 11. A first surface as one surface of the lead frame 11 includes a tin plated layer 7 as a first plated layer, and an intermetallic compound layer formed between the tin plated layer 7 and the metallic member.

In case the metallic member 11 is nickel or iron-nickel alloy, then the intermetallic compound layer is tin-nickel. In case the metallic member 11 is copper or copper alloy, then the intermetallic compound layer is tin-copper. The tin plated layer 7 is about 4.0 µm to 9.0 µm in thickness. The intermetallic compound layer is about 0.4 µm to 2.0 µm in thickness. The first surface corresponds to the outer surface side after bending of the positive electrode terminal 3 and negative electrode terminal 4 shown in FIG. 1, and the first surface is soldered to a substrate. The tin plated layer 7 and the intermetallic compound layer are formed by a step of directly forming the tin plated layer 7 without undercoat on the surface of the metallic member and by a step of forming the intermetallic compound layer of tin-nickel or tin-copper between the metallic member and the tin plated layer 7 through heat reflow treatment.

A second surface as the other surface of the lead frame 11 includes a nickel undercoat layer 8 disposed on the surface of the metallic member, and a silver plated layer 9 disposed on the undercoat layer 8. The nickel undercoat layer 8 is about 0.3 µm in thickness. The silver plated layer 9 is about 1.0 µm in thickness. The second surface, in FIG. 1, corresponds to the side connected to the capacitor element 1. The second surface is connected to the capacitor element 1. In this way, an element fixed portion 10 is formed.

In a capacitor thus configured, an experiment was performed with respect to the thickness of tin plated layer. That is, iron-nickel alloy was used as a strip-form metallic member which forms the lead frame 11. The iron-nickel alloy used was 42 alloy of 42% Ni—Fe alloy. The tin plated layer 7 was directly formed on the metallic member without undercoat in a variety of thickness. Subsequently, these were subjected to reflow treatment in an atmosphere of various oxygen densities at 500° C., thereby forming a tin-nickel intermetallic compound layer between the metallic member and the tin plated layer 7. Thus, capacitors in the embodiments 1 through 20 were manufactured by 100 pieces each. These capacitors were subjected to a moisture resistance test in an atmosphere at 60° C., 90–95% RH for 240 hours, and also, the solder wattability after the moisture proof test was evaluated. The results of the wettability test are shown in Table 1. The wettability was evaluated by the solder equilibrium method based upon ELAJ method, ET-7404. The solder paste used was RMA type of Sn-37Pb. The evaluation temperature is 235° C. In the evaluation of solder wettability, it is judged to be "○" when zero crossing time is 3.0 sec. or less, and "X" when zero crossing time is 3.1 or over.

TABLE 1

| | Sn plated layer thickness (µm) | Oxygen in reflow furnace (ppm) | Wettability after moisture proof test |
|---|---|---|---|
| Embodiment 1 | 3 | 50 | X |
| Embodiment 2 | 3 | 100 | X |
| Embodiment 3 | 3 | 200 | X |
| Embodiment 4 | 3 | 250 | X |
| Embodiment 5 | 4 | 50 | ○ |
| Embodiment 6 | 4 | 100 | ○ |
| Embodiment 7 | 4 | 200 | ○ |
| Embodiment 8 | 4 | 250 | X |
| Embodiment 9 | 5 | 50 | ○ |
| Embodiment 10 | 5 | 100 | ○ |
| Embodiment 11 | 5 | 200 | ○ |
| Embodiment 12 | 5 | 250 | X |
| Embodiment 13 | 8 | 50 | ○ |
| Embodiment 14 | 8 | 100 | ○ |
| Embodiment 15 | 8 | 200 | ○ |
| Embodiment 16 | 8 | 250 | X |
| Embodiment 17 | 10 | 50 | ○ |
| Embodiment 18 | 10 | 100 | ○ |
| Embodiment 19 | 10 | 200 | ○ |
| Embodiment 20 | 10 | 250 | X |

In FIG. 1, when the tin plated layer 7 is 4 µm or over in thickness, the solder wettability is excellent. Particularly, when the oxygen in reflow furnace is 200 or less in density, the solder wettability will be further enhanced.

Although the capacitor is here manufactured with the reflow furnace set at a constant temperature of 500° C., but it is not limited to this, but the temperature in the reflow furnace is desirable to be not lower than the melting point of tin, 231.9° C. However, taking into account the actual mass-production process, it is desirable to further increase the treating temperature for the purpose of realizing short-time melting to shorten the tact time for production. That is, the optimum temperature range is 400° C. to 800° C. Accordingly, the temperature in the reflow furnace is set to 500° C. in the present embodiment.

Next, as for capacitors having the above configuration, the relations of the kind of metallic member, thickness of tin-nickel intermetallic compound layer, and heat resisting adhesion of tin plated layers of these capacitors were evaluated. That is, as strip-form metallic members, 30% Ni—Fe alloy (30 alloy), 42% Ni—Fe alloy (42 alloy) and 100% nickel were used. A tin plated layer 7 of 6.0 µm in thickness was directly formed, without undercoat, on each of these metallic members. Subsequently, these were subjected to reflow treatment at temperatures ranging from 300° C. to 800° C. to form tin-nickel intermetallic compound, various in thickness, between the tin plated layer and the metallic member. Each of these capacitors was evaluated with respect to the heat resisting adhesion of tin plated layer. The results of evaluation are shown in Table 2. The oxygen density in reflow treatment is 200 ppm. The thickness of intermetallic compound was calculated according to the data obtained by the Auger electron spectroscopy (AES). In making the criteria for heat resisting adhesion, a metallic member having a tin plated layer and intermetallic compound layer was bent in U-shape of 0.5 mm bend radius and left in the atmosphere at 125° C. for 1000 hours, and after that, the bent portion surface of the tin plated layer was observed by a streoscopic microscope (magnification of ×10). It is judged to be "○" when the bent portion is not peeling, and "Δ" when the bent portion is partially peeling, and "X" when the bent portion is totally peeling. The results of the test are shown in Table 2.

TABLE 2

| Strip-form metallic members | Reflow temperatures (° C.) | Thickness of tin-nickel intermetallic compound layer (μm) | Heat resisting adhesion of tine plated layer |
|---|---|---|---|
| 30 alloy | 300 | 0.1~0.2 | X |
| 30 alloy | 350 | 0.2~0.3 | Δ |
| 30 alloy | 400 | 0.4~0.6 | ○ |
| 42 alloy | 500 | 0.5~0.7 | ○ |
| 100% nickel | 800 | 1.7~2.0 | ○ |

In Table 2, when the tin-nickel intermetallic compound layer 0.4 μm or over in thickness, the bent portion does not peel at all and very excellent heat resisting adhesion can be obtained. When the intermetallic compound layer ranges from 0.2 μm to 0.3 μm in thickness, peeling takes place partially. When the intermetallic compound layer ranges from 0.1 μm to 0.2 μm thickness, peeling takes place over the entire surface. That is, in order to obtain very excellent heat resisting adhesion of the tin plated layer, the tin-nickel intermetallic compound layer should be at least 0.4 μm in thickness. Further, for obtaining excellent heat resisting adhesion, it is better to use 42 alloy that contains a higher percentage of nickel or 100% nickel than to use 30 alloy that contains a lower percentage of nickel. Also, thicker tin-nickel intermetallic compound layer can be obtained by making the reflow temperature higher.

Figure 3:
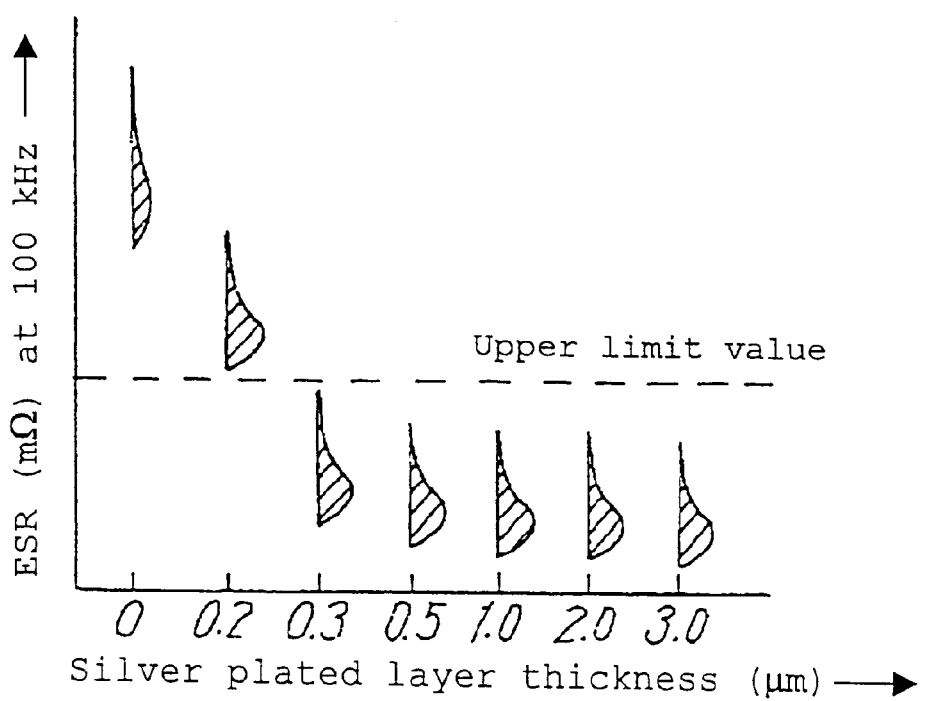
FIG. 3 is a diagram of characteristics showing the relationship between the thickness and ESR characteristic of a silver plated layer in a tantalum solid electrolytic capacitor in the embodiment 1 of the present invention.

FIG. 3 shows the result of checking the relationship between the thickness of silver plated layer 9 disposed at the element fixed portion 10 and the ESR characteristic of the capacitor. ESR stands for equivalent series resistance. In FIG. 3, when the silver plated layer 9 is 0.3 μm or over in thickness, the ESR value is higher, verifying excellent ESR characteristic.

A capacitor in the present exemplary embodiment has a configuration such that a tin plated layer 7 is formed, without undercoat, directly on a metallic member having a positive electrode terminal 3 and negative electrode terminal 4, and a tin-nickel or tin-copper intermetallic compound layer is formed by reflow treatment between the metallic member and the tin plated layer 7. In this way, it is possible to simplify the plating process and to reduce the manufacturing cost. Further, excellent wettability can be realized for a long period of time. Also, capacitors with terminals ensuring excellent heat resisting adhesion can be obtained. Thus, the capacitors obtained have all the desired effects.

In the present exemplary embodiment, as capacitor element 1, an element for tantalum solid electrolytic capacitor made by press-forming and sintering of tantalum powder with positive electrode lead wire 2 buried-in has been described. However, it is not limited to this configuration, and it is also possible to use an element for solid electrolytic capacitor formed from valve metal foil, and in this case, same effects as described above can be obtained.

Also, as capacitor element 1, it is not limited to this configuration, and it is also possible to use an element for solid electrolytic capacitor comprising a valve metal, a dielectric oxide film layer formed on the surface of the valve metal, a solid electrolytic layer formed from conductive polymer disposed on the dielectric oxide film layer, and a negative electrode layer disposed on the solid electrolytic layer.

Also, as a first plated layer formed on the positive electrode terminal 3 and negative electrode terminal 4, it is possible to use a silver-base alloy layer such as a tin-silver plated layer, tin-bismuth plated layer, tin-zinc plated layer, or tin-copper plated layer. And also in this case, same effects as described above can be obtained.

Exemplary Embodiment 2

The capacitor of the exemplary embodiment 2 is different in configuration for plating on the positive electrode terminal and negative electrode terminal as compared with the capacitor of the exemplary embodiment 1. For other configurations and the manufacturing method, the exemplary embodiment 2 is identical with the exemplary embodiment 1. The portions identical with those of the exemplary embodiment 1 are given same reference numerals and the description is omitted, and only the portions different from those of the exemplary embodiment 1 will be described in the following.

Figure 4:
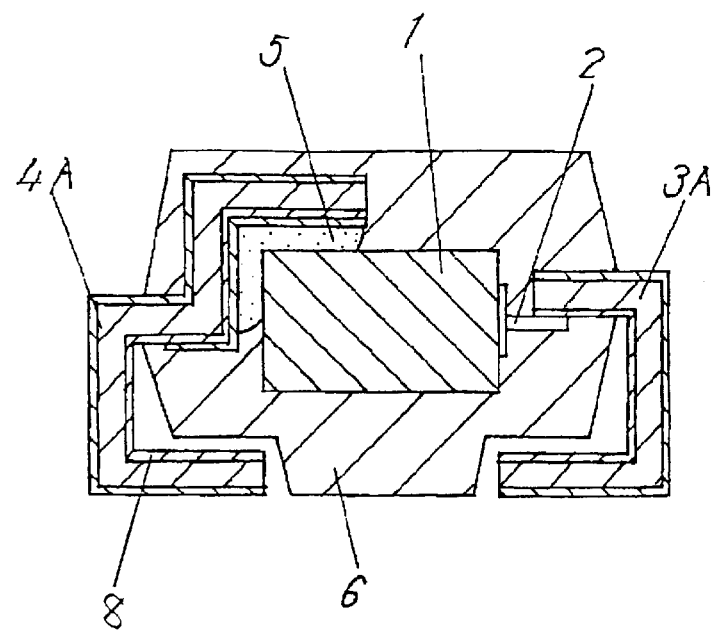
FIG. 4 is a sectional view showing the configuration of a tantalum solid electrolytic capacitor in the embodiment 2 of the present invention.
Figure 5:
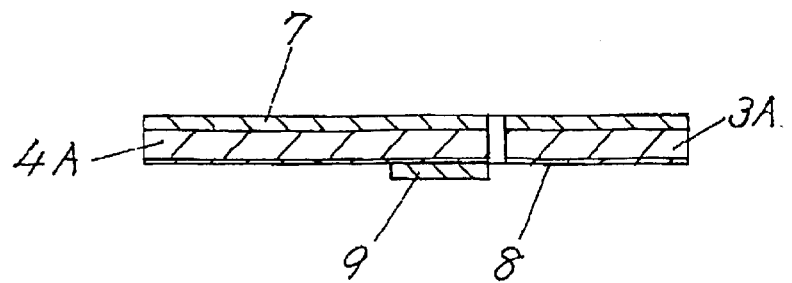
FIG. 5 is a sectional view of a lead frame forming a positive electrode terminal and a negative electrode terminal used for a tantalum solid electrolytic capacitor in the embodiment 2 of the present invention.

FIG. 4 is a sectional view showing the configuration of a tantalum solid electrolytic capacitor in the exemplary embodiment 2. FIG. 5 is a sectional view of a lead frame which forms a positive electrode terminal and a negative electrode terminal used for the capacitor. In FIG. 4 and FIG. 5, the capacitor comprises the positive electrode terminal 3A and the negative electrode terminal 4A. Each of the positive electrode terminal 3A and negative electrode terminal 4A includes a first surface and a second surface on the back thereof. The first surface can be soldered to a substrate. A tin plated layer 7 (4.0 μm to 9.0 μm thick) is directly formed without undercoat on the surface of a metallic member at each first surface of the terminals 3A and 4A. Further, a tin-nickel or tin-copper intermetallic compound layer (0.4 μm to 2.0 μm thick, not shown) is formed by reflow treatment between the metallic member and the tin plated layer 7.

Each second surface of the positive electrode terminal 3A and negative electrode terminal 4A is a surface connected to the capacitor element 1. As shown in FIG. 5, a nickel undercoat layer 8 (0.3 μm thick) is formed on the metallic member surface over the entire second surface. Further, a silver plated layer 9 (1.0 μm thick) is formed on a portion connected to the capacitor element 1 on the undercoat layer 8. Thus, an element fixed portion 10 is formed.

That is, in the present exemplary embodiment 2, the nickel undercoat layer 8 is disposed on the entire second surface of each terminal of the positive electrode terminal 3A and negative electrode terminal 4A. On the other hand, in the above exemplary embodiment 1, the nickel undercoat layer 8 is disposed only on a portion connected to the capacitor element 1 on the second surface of the negative electrode terminal. When plating is partially performed in the exemplary embodiment 1, a preparatory process such as masking is required. However, in the exemplary embodiment 2, when plating is performed on the entire second surface, any preparatory process such as masking is not required. As a result, it is possible to further simplify the manufacturing process.

Exemplary Embodiment 3

The exemplary embodiment 3 is different in thickness of the tin plated layer disposed on the positive electrode and negative electrode terminal as compared with the above exemplary embodiment 2. That is, the tin plated layer being exposed of the positive electrode terminal and negative electrode terminal is less in thickness. For other configurations and the manufacturing method, the exemplary embodiment 3 is identical with the exemplary embodiment 2. The portions identical with those of the exemplary embodiment 2 are given same reference numerals and the description is omitted, and only the portions different from those of the exemplary embodiment 2 will be described in the following.

Figure 6:
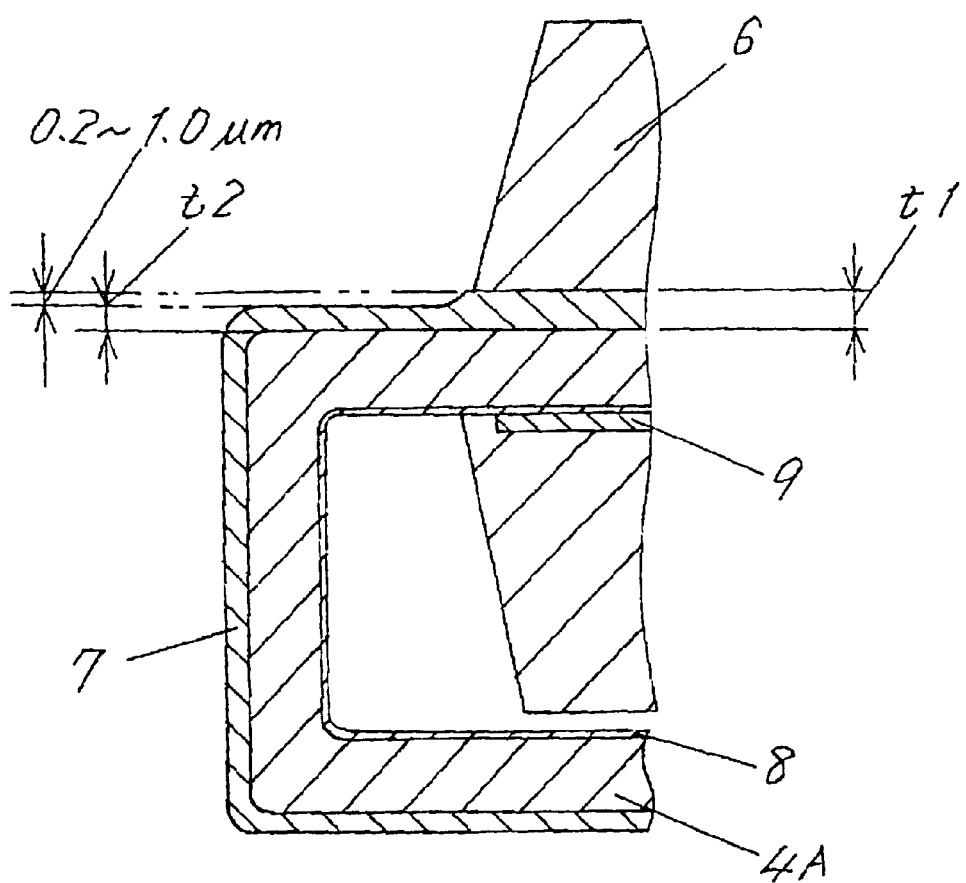
FIG. 6 is a sectional view showing the configuration of a tantalum solid electrolytic capacitor in the embodiment 3 of the present invention.

FIG. 6 is a sectional view of an essential portion showing the configuration of a tantalum solid electrolytic capacitor in the exemplary embodiment 3 of the present invention. In FIG. 6, at the first surface (to be soldered to a substrate) of the negative electrode terminal 4A, a tin plated layer 7 (4.0 μm to 9.0 μm thick) is directly formed without undercoat on the surface of a metallic member. Further, a tin-nickel or tin-copper intermetallic compound layer (0.4 μm to 2.0 μm thick, not shown) is formed by reflow treatment between the metallic member and the tin plated layer 7. Similarly, though not shown, a tin plated layer 7 and an intermetallic compound layer are also formed on the first surface of the positive electrode terminal 3A.

Also, a nickel undercoat layer 8 (0.3 μm thick) is formed on the surface of the metallic member at each entire second surface (to be connected to the capacitor element 1) of the above positive electrode terminal 3A and negative electrode terminal 4A. Further, a silver plated layer 9 (1.0 μm thick) is formed on a portion connected to the capacitor element 1 on the undercoat layer 8. Thus, an element fixed portion 10 is formed.

Also, the thickness "t1" of tin plated layer 7 ranges from 4.0 μm to 9.0 μm, and a part of the tin plated layer 7 is molded by outer jacket resin 6, and the other part is not covered by the outer jacket resin 6. The thickness "t2" of tin plated layer 7 of the portion not covered by the outer jacket resin 6 is machined by blast-grinding or the like and is about 0.2 μm to 1.0 μm less than the thickness "t1".

Figure 7:
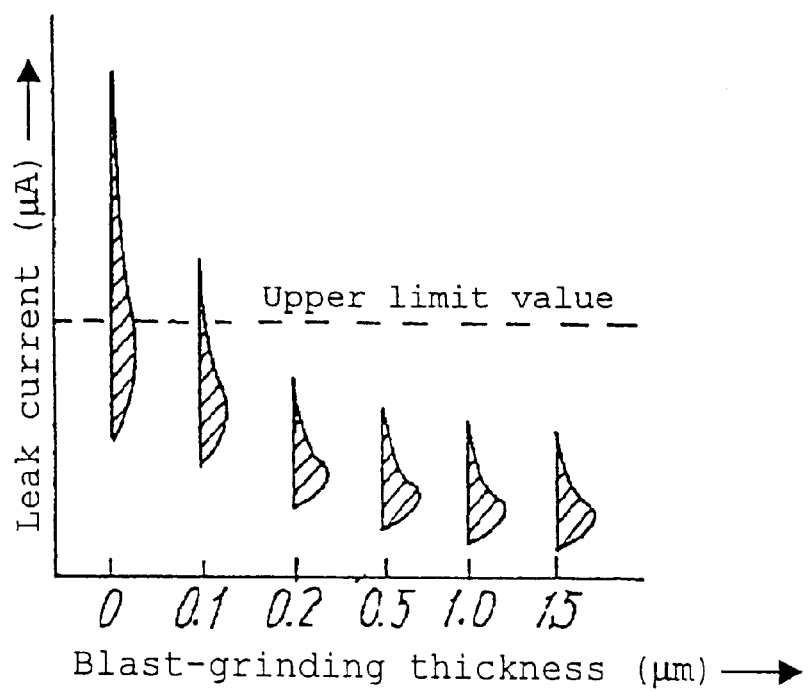
FIG. 7 is a diagram of characteristics showing the relationship between blast-grinding thickness and leak current with respect to a tantalum solid electrolytic capacitor in the embodiment 3 of the present invention.

FIG. 7 is a diagram of characteristics showing the relationship between the blast-grinding thickness and the leak current of the capacitor. In FIG. 7, when t1 is 0.2 μm or over, that is, grinding is done by 0.2 μm or over, the leak current can be lessened thereby assuring reliability.

In this way, since the thickness "t2" of the tin plated layer 7 positioned at the portion, not covered by the outer jacket resin 6, of the positive electrode terminal 3A and negative electrode terminal 4A is about 0.2 μm to 1.0 μm less than the thickness "t1" of the tin plated layer 7 positioned at the portion covered by the outer jacket resin 6, when the positive electrode terminal 3A and negative electrode terminal 4A are bent along the outer jacket resin 6, it is possible to reduce stresses generated due to the bending operation. Accordingly, leak current (LC) that is one of the important characteristics of the capacitor can be lessened. Particularly, by making thinner the soldering surface side that is outside after terminal bending, the above effects may be further enhanced.

Exemplary Embodiment 4

The exemplary embodiment 4 is different in configuration for plating for plating on the positive electrode terminal and negative electrode terminal as compared with the above exemplary embodiment 1. For other configurations and the manufacturing method, the exemplary embodiment 4 is identical with the exemplary embodiment 1. The portions identical with those of the exemplary embodiment 1 are given same reference numerals and the description is omitted, and only the portions different from those of the exemplary embodiment 1 will be described in the following.

Figure 8:
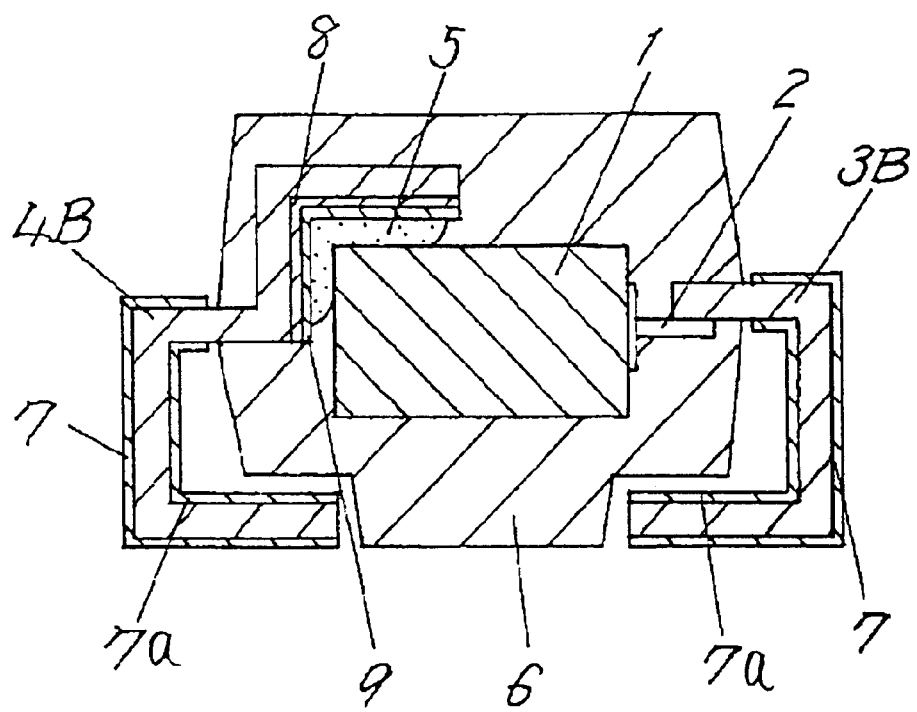
FIG. 8 is a sectional view showing the configuration of a tantalum solid electrolytic capacitor in the embodiment 4 of the present invention.

FIG. 8 is a sectional view showing the configuration of a tantalum solid electrolytic capacitor in the present exemplary embodiment 4.

In FIG. 8, at the first surface (to be soldered to a substrate) of positive electrode terminal 3B and negative electrode terminal 4B, a tin plated layer 7 (4.0 μm to 9.0 μm thick) as a first plated layer is directly formed without undercoat on the surface of a metallic member.

Also, at the connection to the capacitor element 1 on the second surface (to be connected to capacitor element 1) of the negative electrode terminal 4B, a nickel undercoat layer 8 (0.3 μm thick) is formed on the surface of a metallic member. Further, a silver plated layer 9 (1.0 μm thick) is formed on the undercoat layer 8. Also, at the second surface of the negative electrode terminal, a second tin plated layer 7a as a second plated layer is directly formed without undercoat at a position at least 0.5 mm apart from the connection.

Similarly, at the second surface of positive electrode terminal 3B, a second tin plated layer 7a is formed. A second intermetallic compound layer (0.4 to 2.0 μm thick) of tin-nickel or tin-copper is formed by reflow treatment between the metallic member and the second tin plated layer 7a. Thus, an element fixed portion is formed. By this configuration, the electrical characteristics of the capacitor will become further stabilized.

In this way, the capacitor in the present exemplary embodiment has a configuration such that an intermetallic compound layer of tin-nickel or tin-copper is formed on each surface of the positive electrode terminal 4A and the negative electrode terminal 4B. As a result, it is possible to further stabilize the electric characteristics of the capacitor.

Exemplary Embodiment 5

The exemplary embodiment 5 is different in configuration for plating on the positive electrode terminal and negative electrode terminal and in shaper after bending as compared with the exemplary embodiment 1. For other configurations and the manufacturing method, the exemplary embodiment 5 is identical with the exemplary embodiment 1. The portions identical with those of the exemplary embodiment 1 are given same reference numerals and the description is omitted, and only the portions different from those of the exemplary embodiment 1 will be described in the following.

Figure 9:
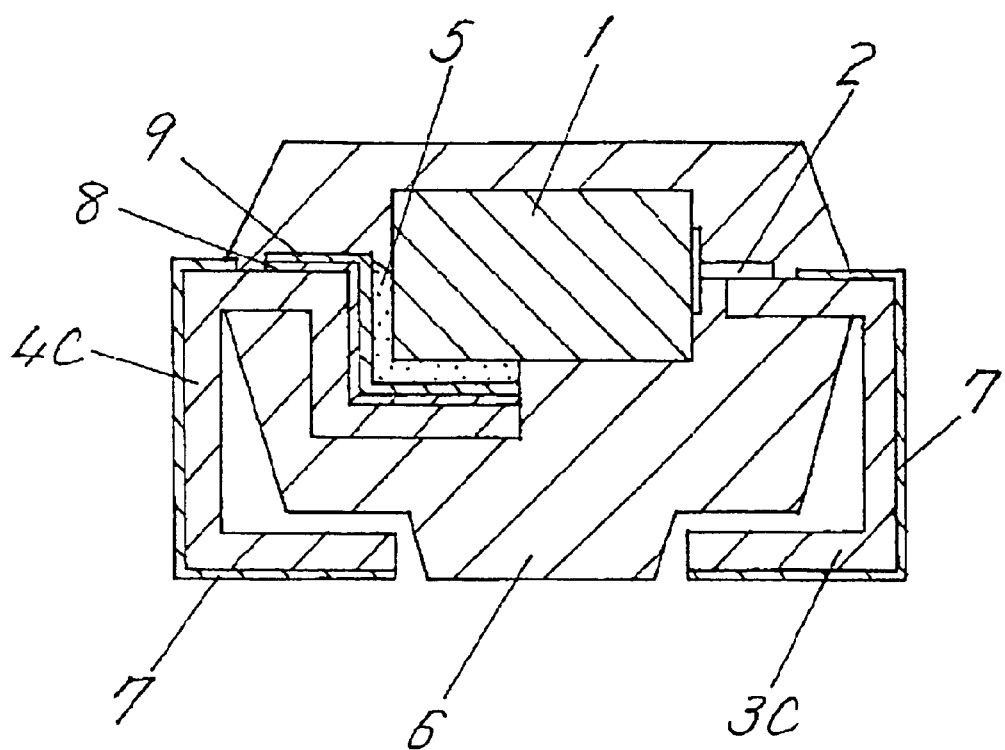
FIG. 9 is a sectional view showing the configuration of a tantalum solid electrolytic capacitor in the embodiment 5 of the present invention.

FIG. 9 is a sectional view showing the configuration of a tantalum solid electrolytic capacitor in the exemplary embodiment 5. In FIG. 9, the capacitor has a positive electrode terminal 3C and negative electrode terminal 4C. One part of a first surface as one surface of the negative electrode terminal 4C is soldered to a substrate, and further, the other part of the first surface is connected to capacitor element 1. That is, at the first surface of the negative electrode terminal 4C, a nickel undercoat layer 8 (0.8 μm thick) is formed on the surface of a metallic member of the portion connected to the capacitor element 1, and also, a silver plated layer 9 (1.0 μm thick) is formed on the undercoat layer 8. Thus, an element fixed portion 10 is formed. Also, at the first surface, a tin plated layer 7 is directly formed without undercoat on the surface of the metallic member, at least 0.5 mm apart from the silver plated layer 9. The tin plated layer 7 is formed on the first surface of the positive electrode terminal 3C. A tin-nickel or tin-copper intermetallic compound layer (0.4 μm to 2.0 μm thick, not shown) is formed by reflow treatment between the metallic member and the tin plated layer 7. The positive electrode terminal 3C and negative electrode terminal 4C are different in bending shape from those in the exemplary embodiment 1. For the other configurations, there is no difference from the exemplary embodiment 1.

Thus, in the present exemplary embodiment, the positive electrode terminal 3C and negative electrode terminal 4C are changed in bending shape, and only one of the surfaces of the positive electrode terminal 3C and negative electrode terminal 4C is plated. By this configuration, as in the exemplary embodiments 1 to 4, it is not required to perform plating on both surfaces of the terminal, thereby further simplifying the manufacturing process. As a result, it is possible to reduce the cost.

Exemplary Embodiment 6

The exemplary embodiment 6 relates to a method of manufacturing a positive electrode terminal and a negative electrode terminal which are used for a tantalum solid electrolytic capacitor.

Figure 10:
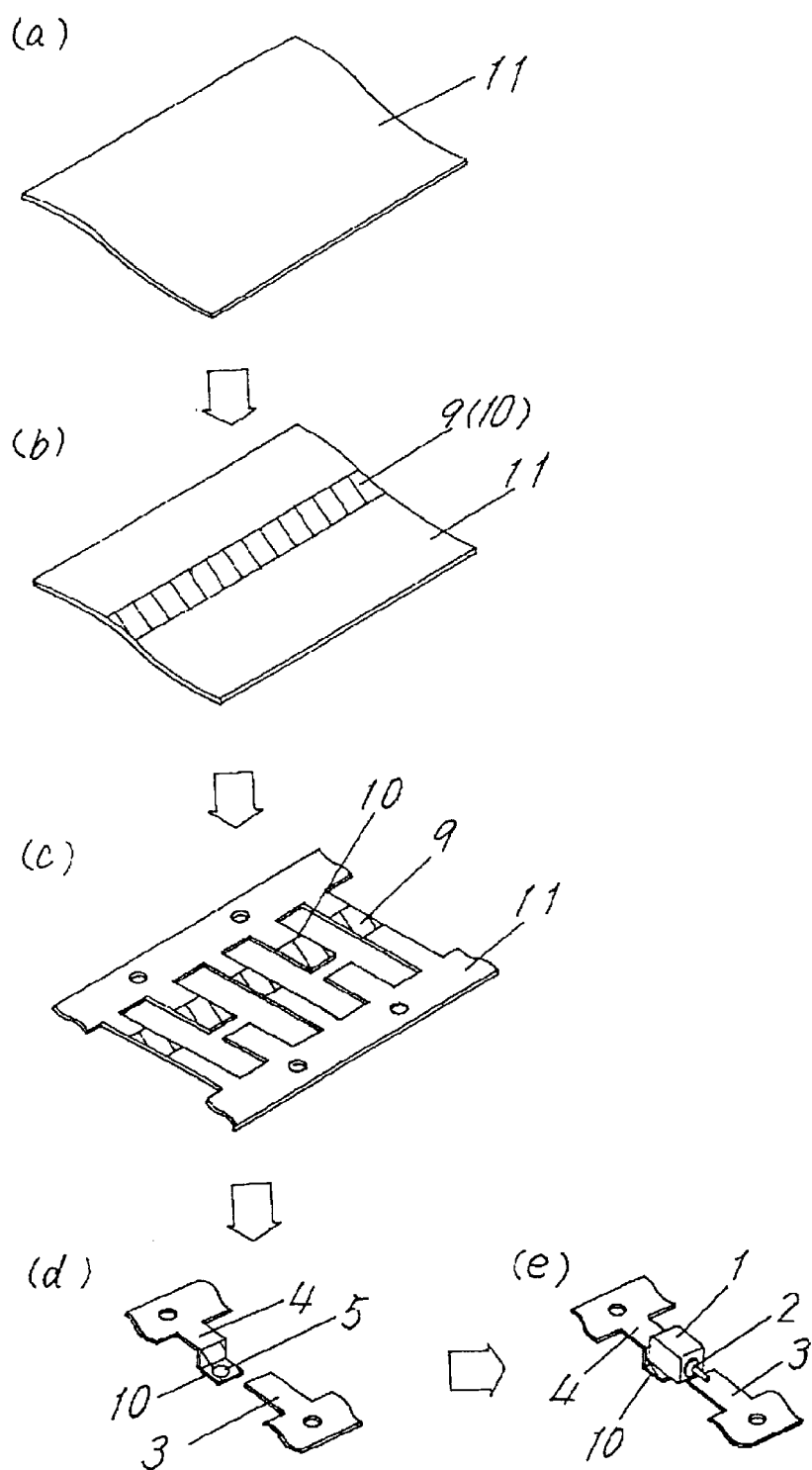
FIG. 10 is a manufacturing process diagram showing a method of manufacturing a positive electrode terminal and negative electrode terminal of a capacitor based on a first-plating-after-pressing system in the embodiment 6 of the present invention.

FIG. 10 is a manufacturing process diagram showing a manufacturing method by a first-plating-after-pressing system in the manufacture of a positive electrode terminal and negative electrode terminal of a capacitor based on the present exemplary embodiment 6.

In FIG. 10, first, as shown in FIG. 10(a), a tin plated layer (not shown) is directly formed without undercoat on one side (back side in the figure) of a strip-form metallic member (lead frame) 11 of nickel or iron-nickel alloy (such as 42 alloy) or copper or copper-alloy (such as copper-nickel-tin alloy). Next, a tin-nickel or tin-copper intermetallic compound layer is formed by reflow treatment between the metallic member 11 and the tin plated layer.

Also, as shown in FIG. 10(b), a nickel undercoat layer (not shown) is formed on a portion connected to capacitor element 1 on the other side (surface side in the figure) of the metallic member 11. Further, a silver plated layer 9 is formed on the undercoat layer. Thus, an element fixed portion 10 is formed.

Subsequently, as shown in FIG. 10(c), the metallic member 11 having a plated layer is punched into a predetermined shape.

After that, as shown in FIG. 10(d), the metallic member thus punched is press-formed to manufacture a positive electrode terminal 3 and negative electrode terminal 4 which are bent to a predetermined shape. And conductive bonding agent 5 is applied to the element fixed portion 10 of the negative electrode terminal 4 thus manufactured.

Thereafter, as shown in FIG. 10(e), the negative electrode side of capacitor element 1 is placed on the conductive bonding agent 5 to bond the capacitor element thereto. And positive electrode lead wire 2 led out of the capacitor element 1 is connected by welding or the like to the positive electrode terminal 3. In this way, the capacitor is set up. After that, unnecessary parts are removed from the lead frame 11.

Figure 11:
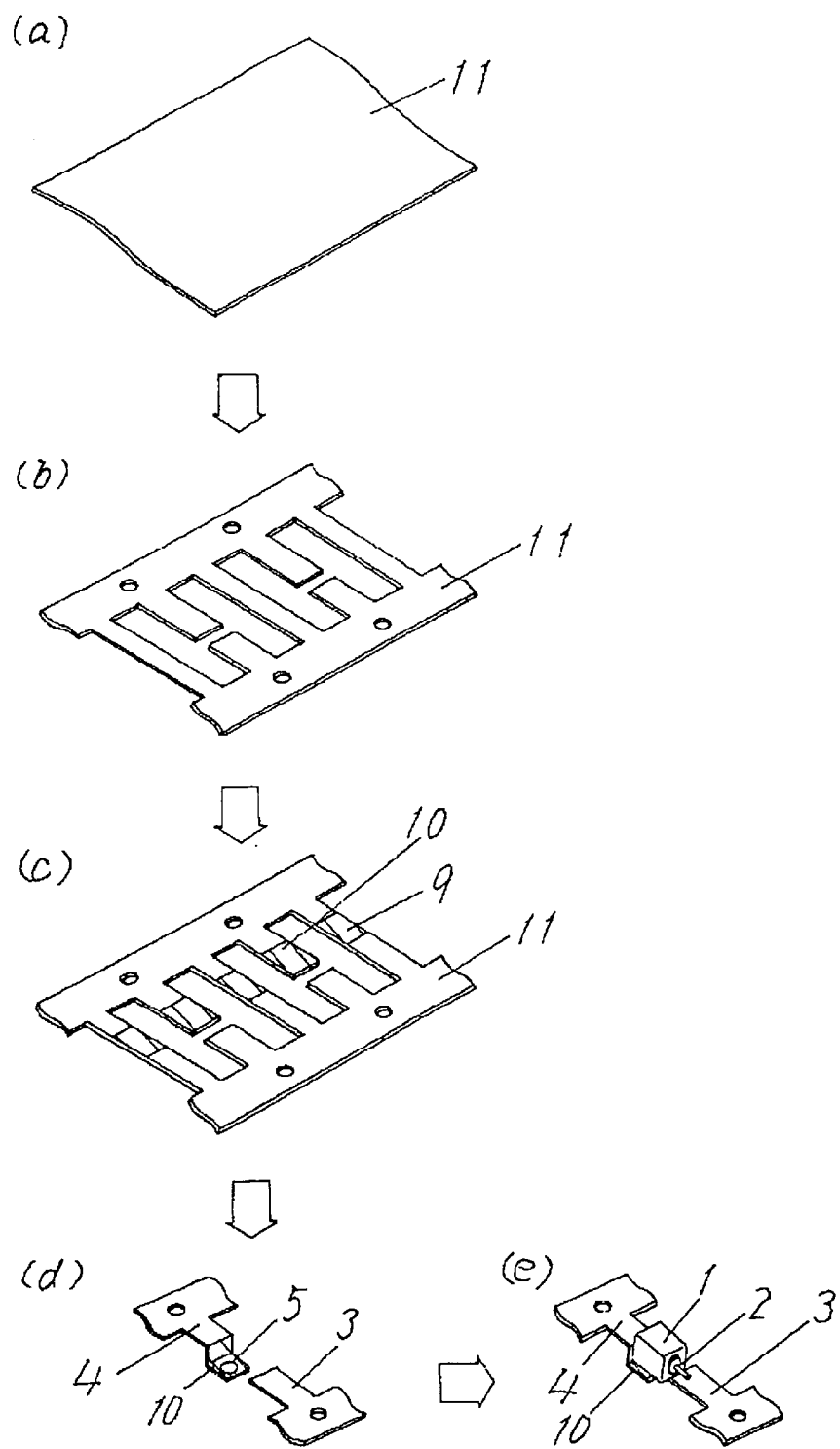
FIG. 11 is a manufacturing process diagram showing a method of manufacturing a positive electrode terminal and negative electrode terminal of a capacitor based on a first-pressing-after-plating system in the embodiment 6 of the present invention.
Figure 12:
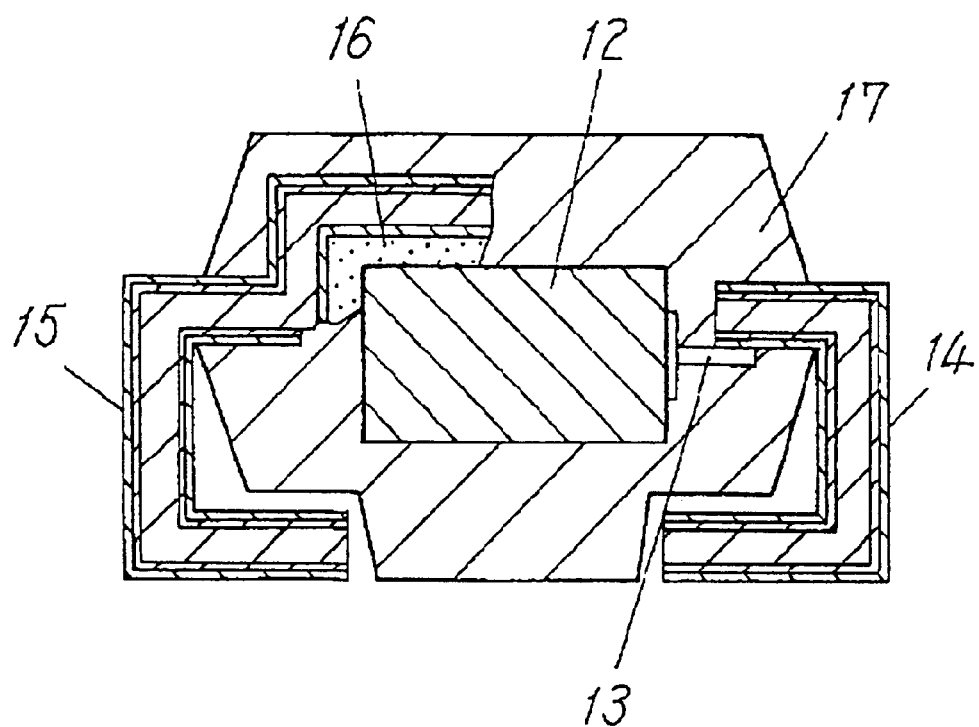
FIG. 12 is a sectional view showing the configuration of a conventional tantalum solid electrolytic capacitor.
Figure 13:
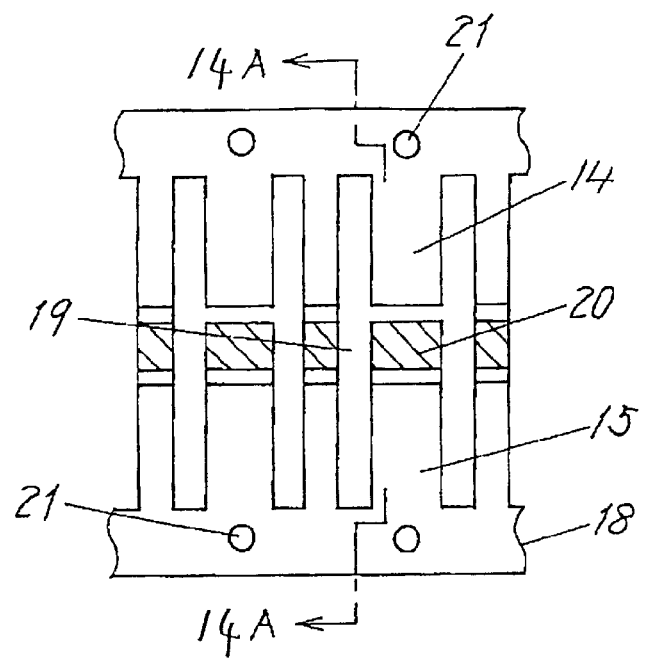
FIG. 13 is a plan view of a lead frame forming a positive electrode terminal and a negative electrode terminal used in a conventional tantalum solid electrolytic capacitor.
Figure 14:
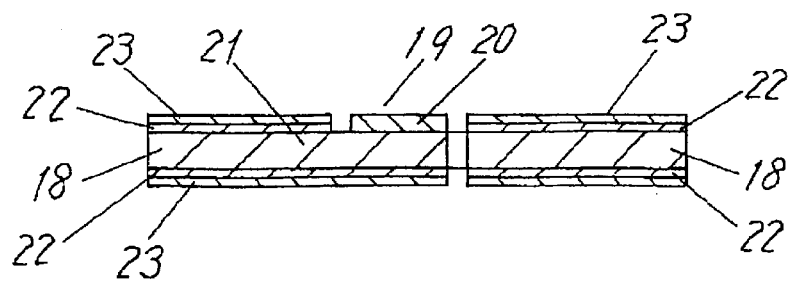
FIG. 14 is a sectional view of the 14A—14A line portion of FIG. 13.

FIG. 11 is a manufacturing process diagram showing a manufacturing method by a first-pressing-after-plating system in the manufacture of a positive electrode terminal and negative electrode terminal of a capacitor based on the present exemplary embodiment 6.

First, as shown in FIG. 11(a), a strip-form metallic member (lead frame) 11 of nickel or iron-nickel alloy (such as 42 alloy) or copper or copper alloy (such as copper-nickel-tin alloy) is prepared.

Next, as shown in FIG. 11(b), the strip-form metallic member 11 is punched into a predetermined shape.

Subsequently, as shown in FIG. 11(c), a tin plated layer (not shown) is directly formed without undercoat on one side (back side in the figure) of the metallic member 11. Further, a tin-nickel or tin-copper intermetallic compound layer is formed by reflow treatment between the metallic member 11 and the tin plated layer. Also, a nickel undercoat layer (not shown) is formed on a portion connected to capacitor element 1 on the other side (surface side in the figure) of the metallic member 11. Further, a silver plated layer 9 is formed on the undercoat layer. Thus, an element fixed portion 10 is formed, thereby obtaining a plated product.

After that, as shown in FIG. 11(d), the plated product is press-formed to manufacture a positive electrode terminal 3 and negative electrode terminal 4. And conductive bonding agent 5 is applied to the element fixed portion 10 of the negative electrode terminal 4 thus manufactured.

Thereafter, as shown in FIG. 11(e), the negative electrode side of capacitor element 1 is placed on the conductive bonding agent 5 to bond the capacitor element thereto. And positive electrode lead wire 2 led out of the capacitor element 1 is connected by welding or the like to the positive electrode terminal 3. In this way, the capacitor is set up. After that, unnecessary parts are removed from the lead frame 11.

By this configuration, it is possible to adopt a manufacturing method based on a first-plating-after-pressing or first-pressing-after-plating system. The manufacturing method adopted is determined by taking various features of each method into consideration.

As described above, by the configuration of the present invention, the terminal plating operation is simplified and the cost is reduced. Also, the terminals are able to ensure excellent solder wettability for a long period of time. Further, the terminals are excellent in heat resisting adhesion. The capacitors obtained are provided with terminals having all the effects. In addition, it is possible to obtain environment-friendly capacitors using no lead that is one of environment polluting substances.

What is claimed is:

1. A solid electrolytic capacitor comprising:
   a capacitor element having a positive electrode leading portion and a negative electrode leading portion;
   a positive electrode terminal electrically connected to said positive electrode leading portion; and
   a negative electrode terminal electrically connected to said negative electrode leading portion,
   wherein said positive electrode terminal and said negative electrode terminal comprise:
      one metallic member including at least one selected from the group consisting of nickel, nickel alloy, copper and copper alloy;
      a first plated layer, formed from at least either one of tin and tin alloy, disposed on said metallic member; and
      an intermetallic compound layer formed between said metallic member and said first plated layer, and
   wherein said intermetallic compound layer comprises:
      (i) tin contained in one of the tin and tin alloy and
      (ii) a compound including at least one of nickel and tin contained in said metallic member.

2. The solid electrolytic capacitor of claim 1,
   wherein said positive electrode terminal and said negative electrode terminal comprise
      said metallic member,
      said first plated layer directly disposed, without undercoat, on said metallic member, and
      said intermetallic compound layer formed by heat reflow treatment between said metallic member and said first plated layer.

3. The solid electrolytic capacitor of claim 1,
wherein said positive electrode terminal includes a plate positive electrode terminal having a first surface and a second surface positioned at the opposite side of said first surface;
said negative electrode terminal includes a plate negative electrode terminal having a first surface and a second surface positioned at the opposite side of said first surface; and
said first plated layer and said intermetallic compound layer are disposed on at least one of the first surface and the second surface of both said positive electrode terminal and said negative electrode terminal.

4. The solid electrolytic capacitor of claim 3,
wherein the first surfaces of said positive electrode terminal and said negative electrode terminal include said first plated layer and said intermetallic compound layer;
the second surfaces of at least one of said positive electrode terminal and said negative electrode terminal includes a plated undercoat layer having nickel and a silver plated layer formed on said undercoat layer, and
a portion having said silver plated layer is electrically connected to said capacitor element.

5. The solid electrolytic capacitor of claim 4,
wherein the second surfaces of said positive electrode terminal and said negative electrode terminal include a olated undercoat layer having nickel;
said negative electrode terminal includes a silver plated layer formed on said undercoat layer; and
a portion having said silver plated layer is electrically connected to said capacitor element.

6. The solid electrolytic capacitor of claim 4,
wherein the first surfaces of said positive electrode terminal and said negative electrode terminal include said first plated layer directly disposed, without undercoat, on said metallic member, and
said intermetallic compound layer formed by heat reflow treatment between said metallic member and said first plated layer.

7. The solid electrolytic capacitor of claim 4, wherein said silver plated layer is 0.3 μm or more in thickness.

8. The solid electrolytic capacitor of claim 3,
wherein the first surfaces of said positive electrode terminal and said negative electrode terminal include said first plated layer and said intermetallic compound layer;
the second surfaces of at least one of said positive electrode terminal and said negative electrode terminal includes a connection to said capacitor element and a second plated portion disposed apart from the connection at a specified interval;
said connection includes a plated undercoat layer having nickel and a silver plated layer disposed on said undercoat layer; and
said second plated portion includes at least one of tin plated layer and tin alloy plated layer disposed on said metallic member.

9. The solid electrolytic capacitor of claim 8,
wherein the specified interval provided between said connection and said second plated layer is 0.5 mm or over.

10. The solid electrolytic capacitor of claim 3,
wherein the first surfaces of said positive electrode terminal and said negative electrode terminal include said first plated layer and said intermetallic compound layer;
the second surfaces of at least one of said positive electrode terminal and said negative electrode terminal includes a connection to said capacitor element and a second plated portion disposed apart from the connection at a specified interval;
said connection includes an undercoat layer having nickel and a silver plated layer disposed on said undercoat layer; and
said second plated portion includes (i) at least one of tin plated layer and tin alloy plated layer disposed on said metallic member and (ii) an intermetallic compound layer disposed between said metallic member and said plated layer.

11. The solid electrolytic capacitor of claim 3,
wherein said positive electrode terminal and said negative electrode terminal are bent so that each first surface of said positive electrode terminal and said negative electrode terminal is positioned on same plane, and
each of the first surfaces are soldered onto a substrate.

12. The solid electrolytic capacitor of claim 3,
wherein each first surface of said positive electrode terminal and said negative electrode terminal comprises said first plated layer directly disposed on said metallic member, and said intermetallic compound layer formed by reflow treatment between said metallic member and said first plated layer;
the second surface of said negative electrode terminal has a connection;
the connection includes a nickel plated undercoat layer disposed on said metallic member, and a silver plated layer disposed on said undercoat layer;
the connection is electrically connected to said negative electrode leading portion;
the second surface of said positive electrode terminal is electrically connected to said positive electrode leading portion;
said positive electrode terminal and said negative electrode terminal are bent so that each first surface of said positive electrode terminal and said negative electrode terminal is positioned on same plane; and
each of the first surfaces are soldered onto a substrate.

13. The solid electrolytic capacitor of claim 3,
wherein each first surface of said positive electrode terminal and said negative electrode terminal comprises said first plated layer directly disposed on said metallic member, and said intermetallic compound layer formed by heat reflow treatment between said metallic member and said first plated layer;
each second surface of said positive electrode terminal and said negative electrode terminal comprises a nickel olated undercoat layer disposed on said metallic member;
the second surface of said negative electrode terminal has a connection;
the connection includes a silver plated layer disposed on said undercoat layer;
the connection is electrically connected to said negative electrode leading portion;
the second surface of said positive electrode terminal is electrically connected to said positive electrode leading portion;
said positive electrode terminal and said negative electrode terminal are bent so that each first surface of said positive electrode terminal and said negative electrode terminal is positioned on same plane; and each of the first surfaces are soldered onto a substrate.

14. The solid electrolytic capacitor of claim 3,
wherein each first surface of said positive electrode terminal and said negative electrode terminal comprises said first plated layer directly disposed on said metallic member, and said intermetallic compound layer formed between said metallic member and said first plated layer by heat reflow treatment;

the second surface of said positive electrode terminal comprises a second tin plated layer directly disposed on said metallic member, and a second intermetallic compound layer formed between said metallic member and said second tin plated layer by heat reflow treatment;

the second surface of said negative electrode terminal includes a connection and a second tin plated portion disposed apart from the connection at a specified interval;

the connection has a nickel plated undercoat layer disposed on said metallic member, and a silver plated layer disposed on said undercoat layer;

the connection is electrically connected to said negative electrode leading portion;

the second surface of said positive electrode terminal is electrically connected to said positive electrode leading portion;

said positive electrode terminal and said negative electrode terminal are bent so that each first surface of said positive electrode terminal and said negative electrode terminal is positioned on same plane; and each of the first surfaces are soldered onto a substrate.

15. The solid electrolytic capacitor of claim 3,
wherein the first surface of said positive electrode terminal comprises said first plated layer, and said intermetallic compound layer formed between said metallic member and said first plated layer by heat reflow treatment;

the first surface of said negative electrode terminal includes a connection, and a second plated portion disposed apart from the connection at a specified interval;

the connection has a nickel plated undercoat layer disposed on said metallic member and a silver plated layer disposed on said undercoat layer;

said second plated layer includes said first plated layer, and said intermetallic compound layer formed between said metallic member and said first plated layer by heat reflow treatment;

the connection is electrically connected to said negative electrode leading portion;

one end of the first surface of said positive electrode terminal is electrically connected to said positive electrode leading portion;

said positive electrode terminal and said negative electrode terminal are bent so that each first surface of said positive electrode terminal and said negative electrode terminal is positioned on same plane; and each of the first surfaces are soldered onto a substrate.

16. The solid electrolytic capacitor of claim 1, further comprises an insulative outer jacket resin disposed to cover said capacitor element, wherein said outer jacket resin is disposed so that each of said positive electrode terminal and said negative electrode terminal is partially exposed to the outside.

17. The solid electrolytic capacitor of claim 16,
wherein said first surface includes an exposed portion not covered by said outer jacket resin and an outer jacket portion covered by said outer jacket resin, and said first plated layer positioned at the exposed portion is 0.2 $\mu$m to 1.0 $\mu$m thinner than said first plated layer positioned at said outer jacket portion.

18. The solid electrolytic capacitor of claim 1, wherein said first plated layer is 4.0 $\mu$m or more in thickness.

19. The solid electrolytic capacitor of claim 1,
wherein said intermetallic compound layer is in a range from 0.4 $\mu$m to 2.0 $\mu$m in thickness.

20. The solid electrolytic capacitor of claim 1,
wherein said first plated layer is a tin plated layer.

21. The solid electrolytic capacitor of claim 1,
wherein said capacitor element comprises:
a porous positive electrode body formed by sintering a compact having valve metal powder;
a dielectric oxide film layer formed on said porous positive electrode body;
a solid electrolytic layer disposed on said dielectric oxide film layer; and
a negative electrode layer disposed on said solid electrolytic layer, and
wherein said positive electrode terminal is electrically connected to said positive electrode body, and
said negative electrode terminal is electrically connected to said negative electrode layer.

22. The solid electrolytic capacitor of claim 1,
wherein said capacitor element comprises:
a valve metal;
a dielectric oxide film layer formed on the surface of said valve metal;
a solid electrolytic layer formed from conductive polymer disposed on said dielectric oxide film layer; and
a negative electrode layer disposed on said solid electrolytic layer, and
wherein said positive electrode terminal is electrically connected to said positive electrode body, and
said negative electrode terminal is electrically connected to said negative electrode layer.

23. The solid electrolytic capacitor of claim 1,
wherein one end of said negative electrode terminal and said negative electrode leading portion are electrically connected to each other by conductive bonding agent.

24. The solid electrolytic capacitor of claim 1,
wherein said metallic member includes at least one of the nickel and the nickel alloy, and
said intermetallic compound layer is a compound containing tin and nickel.

25. The solid electrolytic capacitor of claim 1,
wherein said metallic member includes at least one of the copper and the copper alloy, and
said intermetallic compound layer is a compound containing tin and copper.

* * * * *